Jan. 6, 1948.　　　　G. T. DE VRIES　　　　2,433,984
NAVIGATION INSTRUMENT
Filed June 8, 1945　　　　3 Sheets-Sheet 1
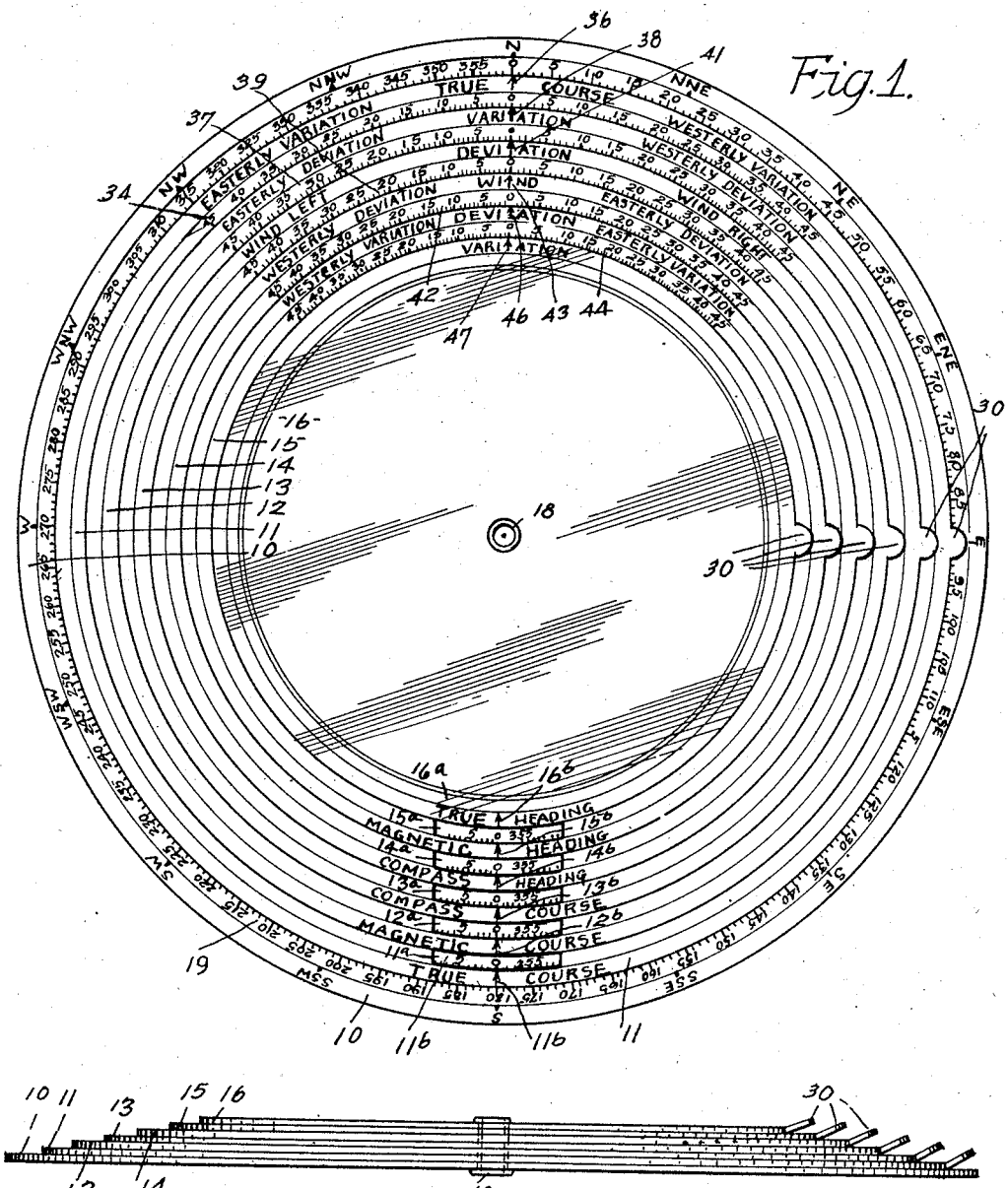
INVENTOR
GEORGE T. DE VRIES Jan. 6, 1948. G. T. DE VRIES 2,433,984
NAVIGATION INSTRUMENT
Filed June 8, 1945 3 Sheets-Sheet 2

INVENTOR
GEORGE T. DE VRIES

Jan. 6, 1948.                G. T. DE VRIES                 2,433,984
                          NAVIGATION INSTRUMENT
                          Filed June 8, 1945          3 Sheets-Sheet 3

INVENTOR
GEORGE T. DE VRIES
by Rudolph L. Lowell
      atty

Patented Jan. 6, 1948

2,433,984

UNITED STATES PATENT OFFICE 2,433,984

NAVIGATION INSTRUMENT

George T. De Vries, Kesley, Iowa

Application June 8, 1945, Serial No. 598,362

3 Claims. (Cl. 235—78)

My invention relates generally to navigational instruments and in particular to a navigation calculator for determining problems in aircraft navigation.

In aircraft navigation there are two basic problems generally to be solved in navigating by dead reckoning. These problems are (1) to determine from a chart, before taking off, the distance and the compass heading to be followed between two points, and (2) to determine and plot on a chart from the observed compass heading and air speed of the plane and while the plane is in flight, the track being made good and the position of the plane along the track at any time.

With regard to problem or case (1) after the intended track has been drawn on a chart, either as a straight line or as a series of straight lines, the compass heading is determined by the four following steps; (a) measure the true course, or courses, on the chart; (b) find the magnetic course by applying magnetic variation; (c) find the compass course by applying compass deviation; and (d) find the compass heading from the compass course by making allowance for the effect of wind.

Thus in case (1) the problem is started with knowing the true course and then by applying variation, deviation and an allowance for wind effects finding the compass heading.

In case (2) the problem is essentially reversed and starts with the compass heading observed in flight being known, which compass heading includes the factors of variation, deviation and allowance for wind effect. The true course to be plotted on the chart is then found by taking away these factors or rectifying the compass heading by the following four steps; (a) rectify the compass heading for deviation to obtain the magnetic heading; (b) rectify the magnetic heading for variation to obtain the true heading; (c) rectify the true heading for wind to obtain the true course being made over the ground, and (d) plot the true course on the chart using the same procedure as for measuring a course in case (1).

It is an object of my invention, therefore, to provide a navigation calculator adapted to directly solve case (1) in a simple, efficient and quick manner to correctly give the compass heading.

A further object of my invention is to provide a navigation calculator which will quickly and accurately solve case (2).

Still another object of my invention is to provide a navigation calculator which will readily solve both cases (1) and (2) by merely reversing its operation without reference to complicated navigating tables and formulas.

Another object of my invention is to provide an aircraft navigation calculator by which the magnetic heading can be determined when there is no deviation.

Yet another object of my invention is to provide an aircraft navigator calculator by which the true heading can be solved when there are no factors of variation and deviation.

A feature of my invention is found in the provision of an air-craft navigating instrument comprised of a plurality of superposed relatively rotatable disc members of varying diameters, provided with associated navigating scales and relatively movable to solve cases (1) and (2).

Further objects, features and advantages of my invention will become apparent from the following description when taken in connection with the accompanying drawings in which:

Fig. 1 is a plan view of the navigating instrument of my invention, with all of the discs moved to zero positions on their corresponding scales;

Fig. 2 is a side elevational view of the navigating instrument;

Figure 3:
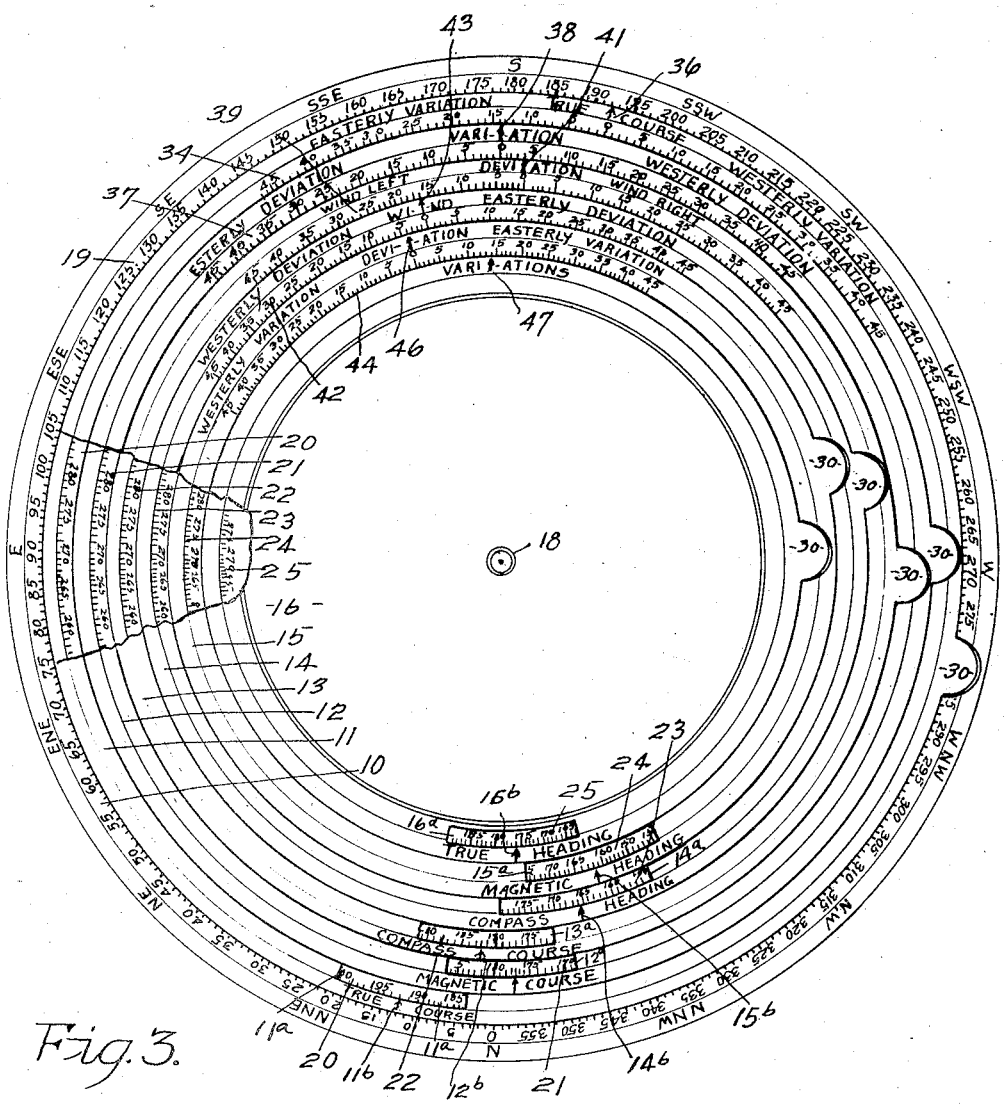
Fig. 3 is a plan view of the instrument with parts in changed position relative to their showing in Fig. 1, and with certain portions broken away to more clearly show its construction.

With reference to the drawings the navigation instrument of my invention is shown in Figs. 1 and 2 as comprising a base member 10 of a solid disc form, having superposed thereon in the following order calculator discs of progressively decreasing diameter; a true course disc 11, a magnetic course disc 12, a compass course disc 13, a compass heading disc 14, a magnetic heading disc 15; and a true heading disc 16. All of the discs are rotatable about a pin 18 extended centrally therethrough and through the base member 10.

The base member 10 is provided with a series of circular scales concentrically arranged on its top surface. These circular scales taken in order in a direction inwardly of the base member 10 are graduated in degrees and comprise a first true course scale 19, a second true course scale 20, a magnetic course scale 21, a compass course scale 22, a compass heading scale 23, a magnetic heading scale 24, and a true heading scale 25 (Fig. 3).

All of the circular scales 19–25, inclusive, on the base member 10 are in one degree graduations over complete circles of 360°.

The zero marking for the angular graduations in the first true course scale 19 is at the top of the base member 10, as viewed in Fig. 1, and the graduation numbering is progressively increased in a clockwise direction. The zero marking indicates a true north course, as designated by the letter N, with a north by northwest course, a northwest course and a west by northwest course being designated by the letters NNW, NW, and WNW at counter-clockwise positions from the north position of 22½°, 45°, and 67½°, respectively. In like manner north by northeast, northeast and east by northeast are indicated by the letters NNE, NE, and ENE, at positions, respectively, of 22½°, 45°, and 67½° in a clockwise direction from the north position N.

The circular scales 20–25, inclusive, have their zero markings in radial alignment at the bottom of the base member 10, as also viewed in Fig. 1, at positions spaced 180° from the zero marking or N position for the first true course scale 19. The numbering of the angular graduations for the scales 20–25, inclusive, increases progressively in a clockwise direction from their corresponding zero markings so as to run in the same direction as the numbering of the graduations in the first true course scale 19. The zero markings for the scales 20–25, inclusive, and the 180° marking for the first true course scale 19 are thus in radial alignment on the base member 10 which radius is indicated by the letter S representing a true south course. Conversely the 180° markings for the scales 20–25, inclusive, and the zero marking for the first true course scale 19 are on the radius designated by the north indication N. In a clockwise direction from the south indication S and relatively spaced 22½° apart are the letters SSW (south by southwest), SW (southwest), WSW (west by southwest) and W (west). In like manner and relatively spaced 22½° apart in a counter-clockwise direction from the indication S are the letters SSE (south by southeast), SE (southeast), ESE (east by southeast) and E (east).

Figure 4:
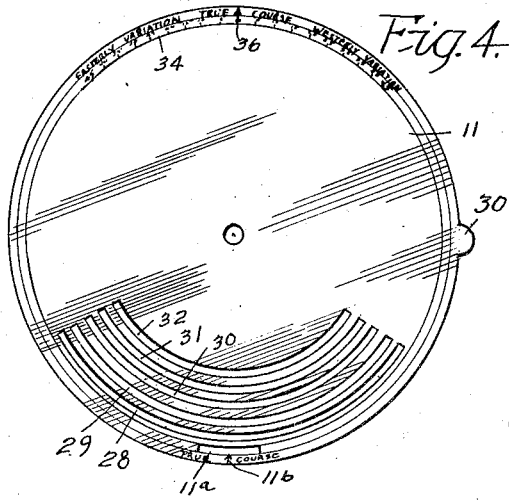

The true course disc 11, which is superposed directly on the base member 10, is formed adjacent its bottom side, as viewed in Figs. 1 and 4, with an arcuate slot 11a extending about 20° in length. The longitudinal center of the slot 11a is indicated by a true course pointer 11b. Concentrically arranged inwardly of the slot 11a are a series of arcuate slots 28–32, inclusive, each of which slots has an angular length of about 90°. At the top of the disc 11, as also viewed in Figs. 1 and 4, and in the circle of the slot 11a are graduations 34 extended 45° to each side of a zero or true course pointer 36 which is located at a point diametrically opposite from the longitudinal center 11b of the slot 11a and the slots 28–32, inclusive. As viewed in Fig. 4 the graduations 34 to the left of the zero marking 36 indicate easterly variation, and the graduations to the right of the zero marking 36 indicate westerly variation.

Figure 5:
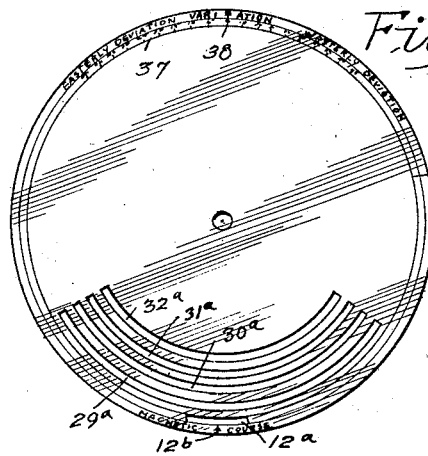

The disc member 12 which is superposed on the disc 11, is formed adjacent its lower side, as viewed in Figs. 1 and 5, with a slot 12a having an angular length of about 20°, and with a series of arcuate slots 29a–32a, inclusive, concentrically arranged inwardly of the slot 12a and each thereof having an annular length of about 90°. The longitudinal center of the slot 12a is indicated by a magnetic course arrow or pointer 12b. In the circle of the slot 12a and at the top of the disc 12, as also viewed in Figs. 1 and 5, are angular graduations 37 extended 45° to each side of a zero or variation pointer 38 located diametrically opposite or 180° away from the pointer marking 12b. The graduations 37 to the left of the zero marking 38 indicate easterly deviation, and the graduations 37 to the right of the zero marking 38 westerly deviation.

Figure 6:
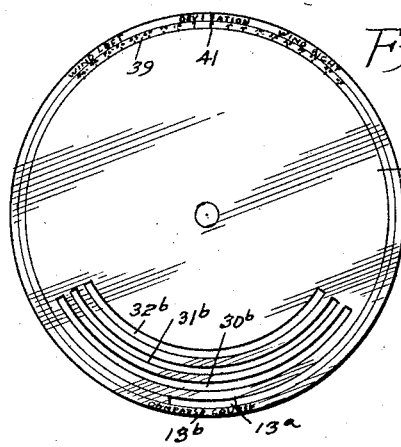
Figs. 4, 5, 6, 7, 8, and 9 are plan views of the superposed rotatable discs in the navigation instrument shown, respectively, in the order in which they are stacked on a base member for the instrument.

The disc member 13, as seen in Figs. 1 and 6, is formed at its bottom side similarly to the disc members 11 and 12, with a short slot 13a, having its longitudinal center indicated by a compass course pointer 13b, and a series of longer arcuate slots 30b, 31b and 32b concentrically arranged inwardly of the short slot 13a. The top of the disc 13 is provided with angular graduations 39 to each side of a zero marking or deviation pointer 41 spaced 180° from the pointer 13b. The graduations 39 to the left of the pointer 41 indicate left wind drift, while the graduations to the right of the pointer 41 indicate right wind drift.

Figure 7:
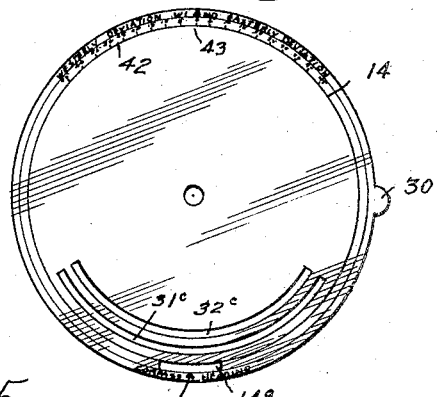

The disc member 14, as viewed in Figs. 1 and 7, is formed at its bottom with a short slot 14a having a longitudinal center indicated by a compass heading pointer 14b and long slots 31c and 32c arranged concentric with and inwardly of the short slot 14a. At the top of the disc 14, and in the circle of the slot 14a are angular graduations 42 extended to each side of a zero marking or wind drift pointer 43 located 180° from the center pointer 14b. The graduations 42 to the left of the pointer 43 indicate westerly deviation, and the graduations to the right of the pointer 43 indicate easterly deviation.

Figure 8:
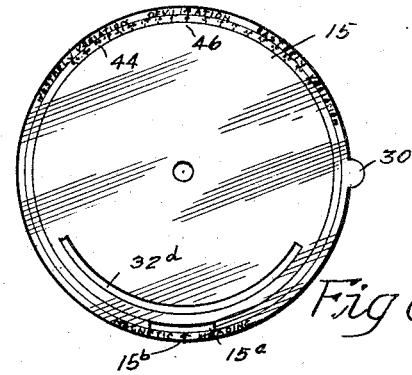

The disc member 15 (Figs. 1 and 8) is formed at its bottom side with a short slot 15a having a longitudinal center indicated by a magnetic heading pointer 15b and a long arcuate slot 32d concentric with and spaced inwardly of the slot 15a. In the circle of the slot 15a and at the top of the disc 15 are angular graduations 44 extended to each side of a zero marking or deviation pointer 46 which is positioned 180° from the pointer 15b. The graduations 44 to the left of the pointer 46 indicate westerly variation, and the graduations to the right of the pointer 46 indicate easterly variation.

Figure 9:
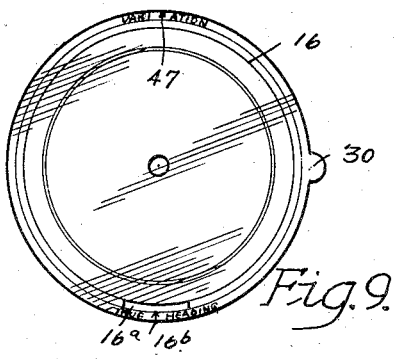

The disc member 16 (Figs. 1 and 9) is formed adjacent its bottom side with a single short slot 16a having a longitudinal center indicated by the true heading pointer 16b. At the top side of the disc 16 is a variation pointer 47 which is spaced 180° from the pointer 16b.

The discs 11–16, inclusive, are stacked or superposed in that order on the base or disc member 10 and the pin 18 is extended through all of the discs and the base member 10. As a result all of the discs are relatively rotatable about the pin 18 as a common center, or a group of discs may be rotated as a unit so that each disc can be rotated alone relative to one or more of the remaining discs, as will appear later. The movement of the discs is facilitated by the provision of tabs or finger grips 30. With the discs thus assembled, as shown in Figs. 1 and 3, the first true course scale is visible about the outer periphery of the disc 11. The second true course scale 20 is visible through the short slot 11a on the disc 11; the magnetic course scale 21 through short slot 12a and long slot 28; the compass course scale 22 through short slot 13a and long slots 29 and 29a; the compass heading scale 23 through the short slot 14a, and the long slots 30, 30a and 30b; the magnetic heading scale 24 through the short slot 15a and the long slots 31, 31a, 31b and 31c, and the true heading scale 25 is visible through the short slot 16a and the long slots 32, 32a, 32b, 32c, and 32d.

As shown in Fig. 1 the short slots 11a–16a, inclusive, are visible from the top of the navigator instrument while the long slots on a lower disc are covered by the discs thereabove. With the pointers 11b–16b, inclusive, moved to positions at the zero markings of the circular scales 20–25, inclusive, all of such pointers are in radial alignment with the 180° marking on the first true course scale 20. At this position of the pointers 11b–16b, inclusive, all of the pointer markings 36, 38, 41, 43, 46 and 47 are in radial alignment with the zero marking on the first true course circle 20 as is clearly illustrated in Fig. 1. Further it is seen that the pointers 36, 38, 41, 43, 46 and 47 on the discs 11–16, inclusive, are operatively associated with the first true course scale 19, and the graduations 34, 37, 39, 42 and 44, respectively, on the base member 10, and discs 11–15, inclusive, respectively.

In the operation of my instrument assume that a plane flight is to be undertaken, which operation corresponds to case (1) explained above, namely, the determination of the compass heading when the true course, variation, deviation and angle of wind drift are known. The true course of the flight to be undertaken is found by plotting a line on a map from the point of departure, or start of the flight, to the destination or end of the flight. Variation, which is the angular difference between true north and magnetic north at the point of departure, is determined from the agonic map corresponding to the locality over which the flight is being made. It is understood, of course, that magnetic variation is the same as compass variation. The factor of deviation, which is the angular difference between the magnetic north and the north indication given by the plane's compass, is determined from the deviation card on the plane's compass. The factor of wind correction or wind drift angle, which is the angle in which the plane must be headed into the wind in order to make good the intended course, is determined from the wind condition at the point of departure or take-off.

By the above procedure, therefore, the four following factors are known: (a) true course, (b), variation, (c) deviation, and (d) wind drift angle. For the purpose of an example let it be supposed that the true course is found to be 192°, the variation 14° east, the deviation 4° west and the wind drift angle 16° left. With this information the compass heading is found, as illustrated in Fig. 3, by setting the true course pointer 36, on the disc 11, at the 192° marking in the first true course scale 19 on the disc 10. With the disc 11 held against movement on the disc 10 the variation pointer 38, on the disc 12, is set at the 14° marking of the easterly variation graduations 34 on the disc 11. The discs 10, 11 and 12 are then held against relative movement and the disc 13 is rotated to position the deviation pointer 41 at the 4° marking of the westerly deviation graduations 42 on the disc 12. In like manner, with the discs 10, 11, 12 and 13 held against relative movement the wind pointer 43, on the disc 14, is set at the 16° marking for wind left of the graduations 39 on the disc 13.

After the discs 10–14, inclusive, have been set in the manner above described the compass heading is read directly in the small slot 14a, in the disc 14, at the compass heading pointer 14b, and as shown in Fig. 3, is seen to be 166°. Likewise in slot 13a the compass course is found to be 182°, and in slots 12a and 11a the magnetic course and true course are found to be 178° and 192°, respectively, it being apparent, of course, that the true course as plotted on the chart and the true course observed through the slot 11a will always be the same.

The true heading is the true course plus or minus the angle of wind drift, or the compass heading rectified for deviation and variation, or the magnetic heading rectified for variation. If the true heading is wanted, therefore, it is readily determined in my instrument by manipulation of the discs 15 and 16 to rectify the compass heading for variation and deviation.

Thus assume the compass heading of 166° as determined for the example given above. With the discs 10–14, inclusive, held together against relative movement, the deviation pointer 46 on the disc 15 is moved to the 4° marking for westerly variation in the graduations 42 on the disc 14. Then with the discs 10–15, inclusive, held together against relative movement, the variation pointer 47 on the disc 16 is set at the 14° marking for easterly variation in the graduations 44 on the disc 15. By reading in the slot 16a in disc 16 the true heading, as shown in Fig. 3, is seen to be 176°, while the magnetic heading in the slot 15a is found to be 162°.

It is seen, therefore, that the determination of the compass heading, when the true course, variation, deviation, and angle of wind drift are known is very readily determined by my navigation instrument without reference to any tables or formulas, and with the result given directly in the proper number of degrees. In addition to the compass heading, the compass course and magnetic course, which are determined in the determination of the compass heading, are retained in my instrument and given at a position in close proximity to the compass heading reading so that all of the readings are compactly arranged in a relatively small space so as to eliminate any unnecessary searching for them on the instrument. Also, if necessary, the true heading and magnetic heading can be determined so that my instrument is capable of giving all determinations required for the execution of case (1) for dead reckoning.

It is to be understood that the compass heading may also be determined, when one or more of the factors of variation, deviation, or angle of wind drift are zero, by merely setting such factors at their zero readings and then proceeding the same in all respects as described above for case (1). In other words, there is no variation when the flight is along the agonic line, no deviation when the flight is in a particular heading or true course, and no wind drift when the flight is in line of a direct head wind or tail wind.

Case (2) arises when the plane is in flight and it is desired to check the true course being made good. As mentioned above case (2) is essentially the reverse of case (1). In the solving of case (2) variation is determined for the locality in which the plane is flying, deviation from the direction of flight, and the new angle of wind drift from whatever instruments are available in the plane such as the wind indicator. In addition to these factors the compass heading is known since it was determined before the flight was undertaken. Thus with the compass heading, variation, deviation, and the angle of wind drift being known the true course made good is determined, in a manner similar to that above described, by setting the variation on discs 11 and 12, deviation on discs 12 and 13, the angle of drift on discs 13 and 14, and the compass heading on discs 13 and 14. The true course will then be read directly in the slot 11a or by the position of the true course pointer 36 on the first true course scale 19.

To find a new compass course and true heading, when the compass course and the true heading being made good, the variation, deviation, and angle of wind drift are known, the known variation, deviation and angle of wind drift are set up in my instrument and with such settings maintained the setting for the known course is made. The new compass course and the true heading will then appear in the slots 13a and 16a, respectively.

To find in flight the error in the angle of wind drift, when the true course and true heading, or the true course and magnetic heading, or the compass course and the compass heading are known, set the known course in its corresponding slot, and then set all courses appearing in the instrument above the known course to the same degree also at their corresponding slots. Then set the known heading at its corresponding slot, and all headings appearing in the instrument below such heading at the same degree at their corresponding slots. The wind correction angle will then be given by the position of the wind pointer 43 on the graduations 39 on the disc 13.

Although in addition to the solving of cases (1) and (2), additional problems which can be solved by my instrument have been given, it is to be understood that many other problems in navigating by dead reckoning can be readily solved by my instrument in a similar manner.

From a consideration of the above description, therefore, it is seen that my invention provides a navigation calculator which is of a compact assembly capable of being easily carried about, comprised only of a plurality of superposed indicating discs assembled for movement relative to each other, or for movement of certain of the discs relative to remaining discs to solve a variety of problems in navigating by dead reckoning. My instrument is not only adapted for use under actual flight conditions, but is particularly useful in the solving of problems usually given in navigation class work for student fliers.

Although the invention has been described with respect to a preferred embodiment thereof it is to be understood that it is not to be so limited since changes and modifications can be made therein which are within the full intended scope of my invention as defined by the appended claims.

I claim:

1. A navigation instrument comprising a base member of disc form having concentrically arranged circular scales thereon including an outer true course scale, an inner true course scale, a magnetic course scale, a compass course scale and a compass heading scale arranged in that order inwardly of said base member, with all of said scales being graduated in 360 equal divisions and the numbering in all of said scales being increased in the same direction and the zero degree marking for said outer true course scale being 180° from the zero degree markings for the remaining ones of said scales, a stack of relatively rotatable discs of progressively decreasing diameter rotatably supported in a concentric relation on said base member with the smallest diameter disc on the top of said stack, with said stacked discs having arcuate slots therein adjacent one side having their longitudinal centers indicated by corresponding pointer marks, said arcuate slots being concentrically arranged in a direction inwardly of the base member so that a slot is positioned for movement about and above a corresponding one of said remaining scales, and said discs below said top disc having at their opposite side equally spaced angular divisions with a zero marking located 180° from the pointer markings thereon, with the spaced angular divisions on the lowermost one of said discs indicating variation, the spaced angular divisions on the next adjacent disc indicating deviation, and the spaced angular divisions on the second disc above said lowermost disc indicating wind drift.

2. A navigation instrument comprising five stacked disc members relatively rotatable about a common center, said discs being of a relatively decreasing diameter toward the top of the stack so that the peripheral edge of a lower disc is visible outwardly from the peripheral edge of a next adjacent upper disc, and with the lowermost disc having thereon a series of concentrically arranged circular scales each of which is divided into 360 equally spaced divisions, and with said scales in a direction inwardly of said lowermost disc indicating, respectively, a first true course, a second true course, a magnetic course, a compass course, and a compass heading, with the divisions of all of said scales being numbered in a clockwise direction, and with the zero marking of said first true course scale being spaced 180° from the zero markings for the remaining ones of said scales, with each of said discs above said lowermost disc having an arcuate slot at one side open to one of said scales, and a pointer associated with the slot for indicating the reading on the scale within said slot, with the discs between the upper disc and the lower disc in said stack of discs having at their opposite sides equally spaced angular divisions provided with a center zero marking positioned 180° from a corresponding slot pointer, with the angular divisions on upwardly successive ones of the intermediate discs indicating, respectively, variation, deviation and wind drift.

3. A navigation instrument comprising seven stacked disc members relatively rotatable about a common center, said discs being of a relatively decreasing diameter toward the top of the stack so that the peripheral edge of a lower disc is visible outwardly from the peripheral edge of a next adjacent upper disc, and with the lowermost disc having thereon a series of concentrically arranged circular scales, each of which scales is divided into 360 equally spaced divisions and with said scales in a direction inwardly of said lowermost disc indicating, respectively, a first true course, a second true course, a magnetic course, a compass course, a compass heading, a magnetic heading and a true heading, with the divisions in all of said scales being numbered in a clockwise direction, and with the zero marking of said first true course scale being spaced 180° from the zero markings for the remaining ones of said scales, with each of said discs above said lowermost disc having an arcuate slot at one side open to one of said scales, and a pointer associated with a slot for indicating a reading on the scale within said slot, with the discs between the upper disc and the lower disc in said stack having at their opposite sides equally spaced angular divisions provided with a center zero marking positioned 180° from a corresponding slot pointer, with the angular divisions on upwardly successive ones of said intermediate discs indicating, respectively, variation, deviation, wind drift, deviation and variation.

GEORGE T. DE VRIES.

REFERENCES CITED

The following references are of record in the file of this patent:

UNITED STATES PATENTS

| Number | Name | Date |
|---|---|---|
| 765,425 | Herrick | July 19, 1904 |
| 988,665 | Sanders | Apr. 4, 1911 |
| 1,104,844 | Sundell | July 28, 1914 |
| 1,311,641 | Christensen | July 29, 1919 |